No. 745,675. PATENTED DEC. 1, 1903.
L. ROTH.
PROCESS OF MAKING GLUCOSE.
APPLICATION FILED OCT. 21, 1901.
NO MODEL.
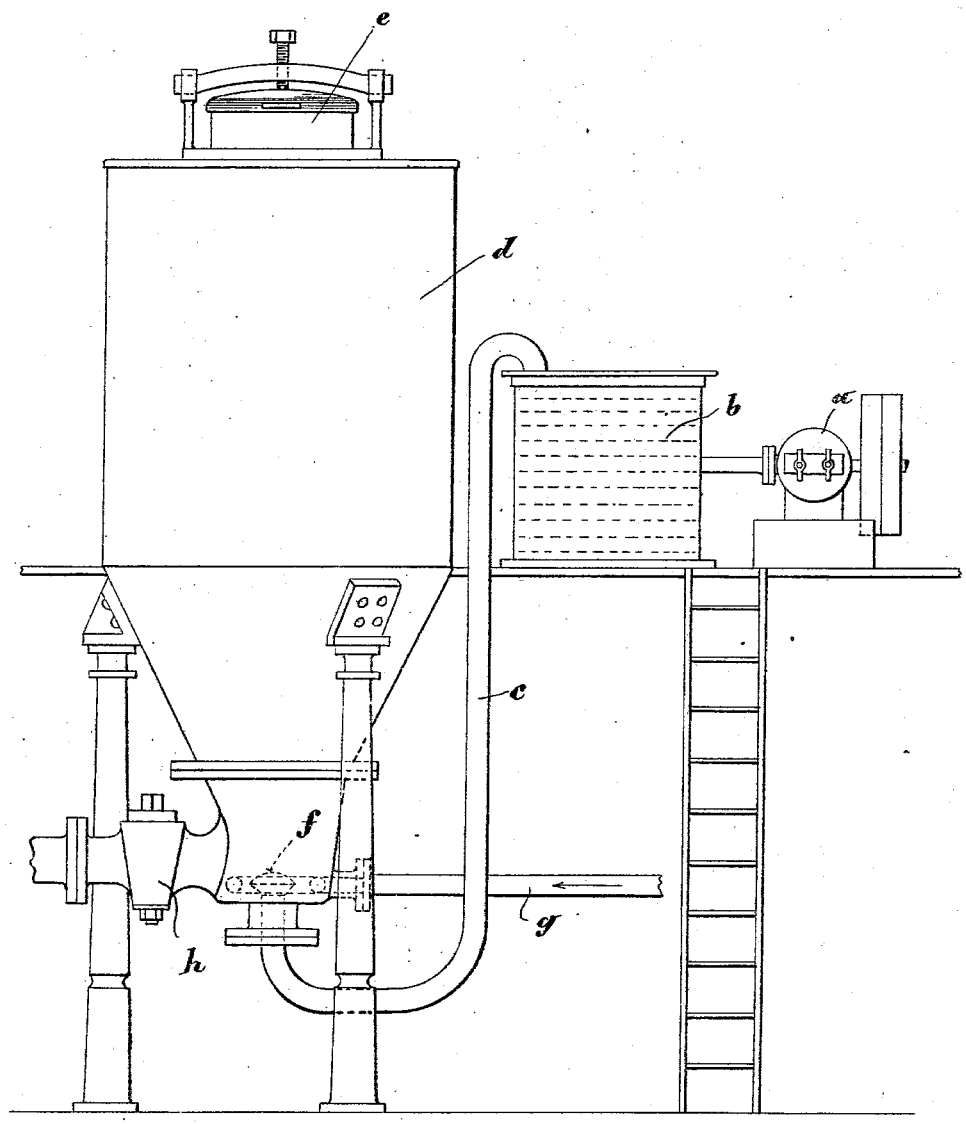
WITNESSES:
Isabella Waldron
Adelaide Claire Gleason
INVENTOR
Leonhard Roth
BY
Richards
ATTORNEYS.

No. 745,675. Patented December 1, 1903.

UNITED STATES PATENT OFFICE.

LEONHARD ROTH, OF KANTH, GERMANY, ASSIGNOR OF ONE-HALF TO WILHELM ROBERT GENTZEN, OF GÜHLICHEN, NEAR GROSS, RINNERSDORF, GERMANY.

PROCESS OF MAKING GLUCOSE.

SPECIFICATION forming part of Letters Patent No. 745,675, dated December 1, 1903.

Application filed October 21, 1901. Serial No. 79,439. (No specimens.)

*To all whom it may concern:*

Be it known that I, LEONHARD ROTH, chemist, of Kanth, in the Province of Silesia, Germany, have invented some new and useful Improvements in Processes of Making Glucose, of which the following is a full and clear description.

The present process has for its purpose the utilization of vegetable waste products which can be had in large quantities—such as empty corncobs, stems, leaves, straw, reed, refuse of wood, &c.—by means of transforming the cellulose contained therein and the substances incrusting said cellulose into dextrose.

In order to execute said process for practical purposes, the respective waste products are placed in vessels or digesters and ozonized oxygen is pressed into the hermetically-closed digesters under a pressure of from three to four atmospheres. For one hundred kilograms one hundred grams of ozone are supposed to be used. It is a well-known fact that ozone cannot be produced in a pure state, it being only possible to obtain a mixture with five per cent. of oxygen—that is to say, as one is to five—said strong oxidizer acting from twenty to thirty minutes. Thereupon a sufficient quantity of sulfuric acid or of muriatic acid (if the inversion has to be effected by means of muriatic acid) is added, so that there results in the digesters a solution of three per cent. or four per cent. for muriatic acid, and then the inversion is effected under a pressure of from three to three and one-half atmospheres.

The accompanying drawing shows in elevation a suitable apparatus for executing the process in question.

Pump $a$ presses the oxygen through ozonizer $b$ and through conduit $c$ into digester $d$, which latter receives the waste products through tube $e$. Pipe $c$ ends appropriately in a perforated nozzle. Steam can be made to pass into digester $d$ through conduit $g$, said digester $d$ being emptied by means of discharge-cock $h$.

The experiments made with various vegetable waste products have resulted as follows: one hundred kilograms of pine wood, 44.5 kilograms containing thirty-four kilograms of dextrose f. attenuation; one hundred kilograms of empty corncobs, sixty-eight kilograms containing forty-two kilograms of dextrose f. attenuation; one hundred kilograms of straw, (wheat,) sixty-eight kilograms containing forty kilograms of dextrose f. attenuation; one hundred kilograms of reed, fifty-seven kilograms containing thirty-eight kilograms of dextrose f. attenuation. The liquors of sugar obtained in this manner are neutralized by means of lime-milk, and the neutral solution can be used now for feeding purposes or for the production of alcohol. In the latter case it is attenuated usually with pure yeast and with an addition of three per cent. of phosphoric acid, whereupon the alcohol is refined. The carbohydrates which cannot be attenuated may be used as fodder, and they are adapted to this purpose just as well as malt-husks or distillers' wash, or even surpass these waste products of other industries.

I claim—

The process herein described consisting in subjecting the cellulosic material under exclusion of air in a closed vessel to ozonized oxygen under pressure and afterward adding sulfuric acid and maintaining the pressure in the vessel, substantially as described.

In witness whereof I have hereunto set my hand in presence of two witnesses.

LEONHARD ROTH.

Witnesses:
WILHELM WEIDNER,
HERMANN HARTSCH.